US010965970B2

(12) United States Patent
Gilson

(10) Patent No.: US 10,965,970 B2
(45) Date of Patent: *Mar. 30, 2021

(54) ADAPTIVE CONTENT SELECTION

(71) Applicant: Comcast Cable Communications, LLC, Philadelphia, PA (US)

(72) Inventor: Ross Gilson, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 84 days.

This patent is subject to a terminal disclaimer.

(21) Appl. No.: 15/863,056

(22) Filed: Jan. 5, 2018

(65) Prior Publication Data

US 2018/0359504 A1 Dec. 13, 2018

Related U.S. Application Data

(63) Continuation of application No. 13/291,355, filed on Nov. 8, 2011, now Pat. No. 9,900,630.

(51) Int. Cl.
| *H04N 21/2343* | (2011.01) |
| *H04N 21/472* | (2011.01) |
| *H04N 21/858* | (2011.01) |
| *H04N 21/658* | (2011.01) |

(52) U.S. Cl.
CPC . *H04N 21/23439* (2013.01); *H04N 21/47214* (2013.01); *H04N 21/6581* (2013.01)

(58) Field of Classification Search
CPC ....... H04N 21/23439; H04N 21/47214; H04N 21/6581
See application file for complete search history.

(56) References Cited

U.S. PATENT DOCUMENTS

| 2002/0161848 | A1 | 10/2002 | Willman et al. |
| 2009/0150943 | A1 | 6/2009 | Vasudevan et al. |
| 2010/0023974 | A1 | 1/2010 | Shiragaki et al. |
| 2010/0158101 | A1* | 6/2010 | Wu .................. H04N 21/23424 375/240.01 |
| 2012/0066338 | A1 | 3/2012 | Asarikuniyil et al. |
| 2012/0141089 | A1 | 6/2012 | Hunt |
| 2012/0170642 | A1* | 7/2012 | Braness ............... G11B 27/005 375/240.01 |
| 2012/0177101 | A1* | 7/2012 | van der Schaar ........................... H04N 21/23439 375/240.01 |
| 2012/0271920 | A1* | 10/2012 | Isaksson ............. H04L 47/2416 709/219 |

(Continued)

*Primary Examiner* — Philip J Chea
*Assistant Examiner* — Robert B McAdams
(74) *Attorney, Agent, or Firm* — Banner & Witcoff, Ltd.

(57) ABSTRACT

An apparatus, method, system, and computer-readable medium are provided for enhancing the quality of content. A determination may be made that a portion of the content received using a base feed or bitrate completed early. In response to that determination, an attempt may be made to download that portion of the content using a differential bitrate or feed corresponding to a higher quality. Another determination may be made whether the differential bitrate or feed download completed early, and if so, then the differential bitrate or feed may be used as a new base bitrate or feed for downloading additional portions of the content. The differential bitrate or feed download may also provide for a secondary playback of the content at higher quality.

20 Claims, 5 Drawing Sheets

(56) References Cited

U.S. PATENT DOCUMENTS

2013/0051554 A1* 2/2013 Braness ............ H04N 21/2393
380/200
2013/0067036 A1* 3/2013 Nooney ............ H04L 65/4084
709/219

* cited by examiner

ADAPTIVE CONTENT SELECTION

CROSS-REFERENCE TO RELATED APPLICATIONS

This application is a continuation of co-pending U.S. application Ser. No. 13/291,355, which was filed on Nov. 8, 2011, and is hereby incorporated by reference in its entirety.

BACKGROUND

Current content distribution techniques include the use of rate adaptive encoded content. A device processing or consuming rate adaptive encoded content can vary the bitrate of the content (e.g., video) as network conditions change.

Initial resolutions and/or frame-rates used during playback might be poor as the device typically will not know what bitrate can be expected on the network. In order to minimize perceived or actual start-up time, the device may initially select a lowest quality stream or resolution/frame rate and then "ramp up" in terms of selecting a higher quality encoding. The "ramp up" may proceed on an iterative basis or in lock-step until the highest quality encoding that the network can support is selected.

There are a number of drawbacks associated with conventional solutions that are identified and addressed in this disclosure. For example, the provisioning of higher quality encoded content may be delayed. For example, the delay may be a result of overly conservative bandwidth estimates. Storage under runs may result in content temporarily being unavailable. Content stored in a buffer or memory might not be improved or enhanced for secondary or subsequent consumption, such as supporting a secondary viewing of video via a rewind command or function, without discarding the initially saved/buffered segment and re-downloading the segment at higher quality.

SUMMARY

This summary is not intended to identify critical or essential features of the disclosure provided herein, but instead merely summarizes certain features and variations thereof.

In some illustrative embodiments, content may be distributed to one or more devices, such as one or more user devices. The content may be encoded. The content may be distributed using one or more feeds, such as one or more channels, frequencies, streams, or layers. The content may be distributed using one or more base feeds. The content may be distributed using one or more differential feeds. For example, scalable video coding (SVC), such as MPEG SVC, may be used. The content may be distributed via one or more computing devices, such as one or more servers, routers, etc.

In some illustrative embodiments, a device may download content and save or store the downloaded content in a memory or buffer. The device may initially download the content via a base feed. In some illustrative embodiments, the device may download (e.g., subsequently download) the content via a differential feed. The download via the differential feed may facilitate a higher quality playback and/or secondary playback at the device.

Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Various connections between elements are discussed in the following description. These connections are general and, unless specified otherwise, may be for example direct or indirect, wired or wireless, and this specification is not intended to be limiting in this respect.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
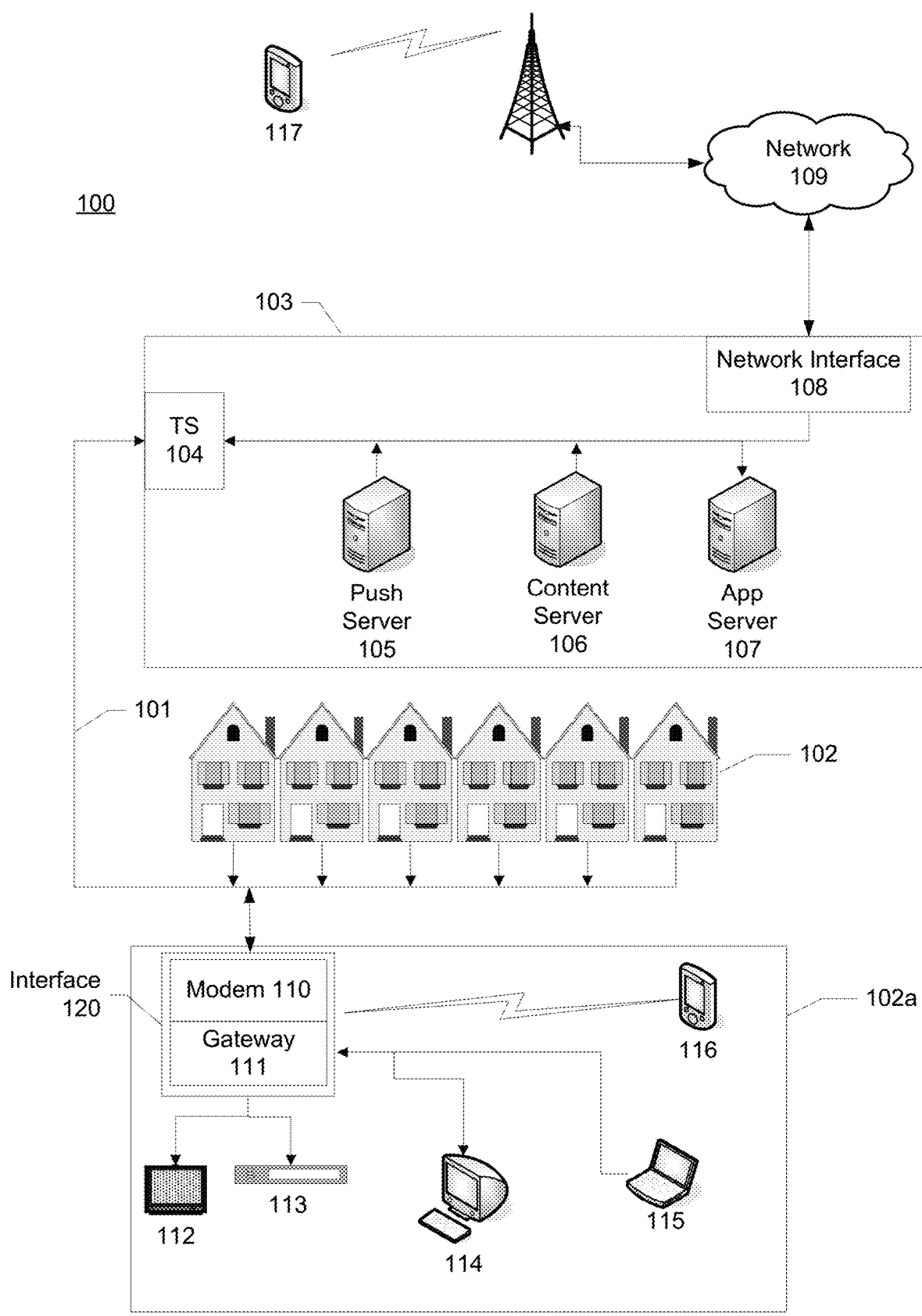
FIG. 1 illustrates an example network.

FIG. 1 illustrates an example network 100 on which many of the various features described herein may be implemented. Network 100 may be any type of information distribution network, such as satellite, telephone, cellular, wireless, etc. One example may be an optical fiber network, a coaxial cable network or a hybrid fiber/coax distribution network. Such networks 100 use a series of interconnected communication lines 101 (e.g., coaxial cables, optical fibers, wireless, etc.) to connect multiple premises 102 (e.g., businesses, homes, consumer dwellings, etc.) to a central office or headend 103. The central office 103 may transmit downstream information signals onto the lines 101, and each premises 102 may have a receiver used to receive and process those signals.

There may be one line 101 originating from the central office 103, and it may be split a number of times to distribute the signal to various premises 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths.

The central office 103 may include a termination system (TS) 104, such as a cable modem termination system (CMTS), which may be a computing device configured to manage communications between devices on the network of lines 101 and backend devices such as servers 105-107 (to be discussed further below). The termination system (TS) may be as specified in a standard, such as the Data Over Cable Service Interface Specification (DOCSIS) standard, published by Cable Television Laboratories, Inc. (a.k.a. CableLabs), or it may be a similar or modified device instead. The termination system (TS) may be configured to place data on one or more downstream frequencies to be received by modems at the various premises 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various premises 102 in the network (or more specifically, to the devices in the premises 102 that are configured to detect such notifications) . The central office 103 may also include a content server 106. The content server 106 may be one or more computing devices that are configured to provide content to users in the premises 102. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central location 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide or interactive program guide listings. Another application server may be responsible for monitoring user viewing habits and collecting that information for use in selecting advertisements. Another application server may be responsible for formatting and inserting advertisements in a video stream being transmitted to the premises 102. Another application server may be responsible for receiving user remote control commands, and processing them to provide an intelligent remote control experience.

An example premises 102a may include an interface 120. In one aspect, the interface 120 may comprise a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the premises 102a to communicate with the central office 103 and other devices beyond the central office. The gateway 111 may be a set-top box (STB), digital video recorder (DVR), computer server, or a combination thereof, or any other desired computing device. The gateway 111 may also include (not shown) local network interfaces to provide communication signals to devices in the premises 102a, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
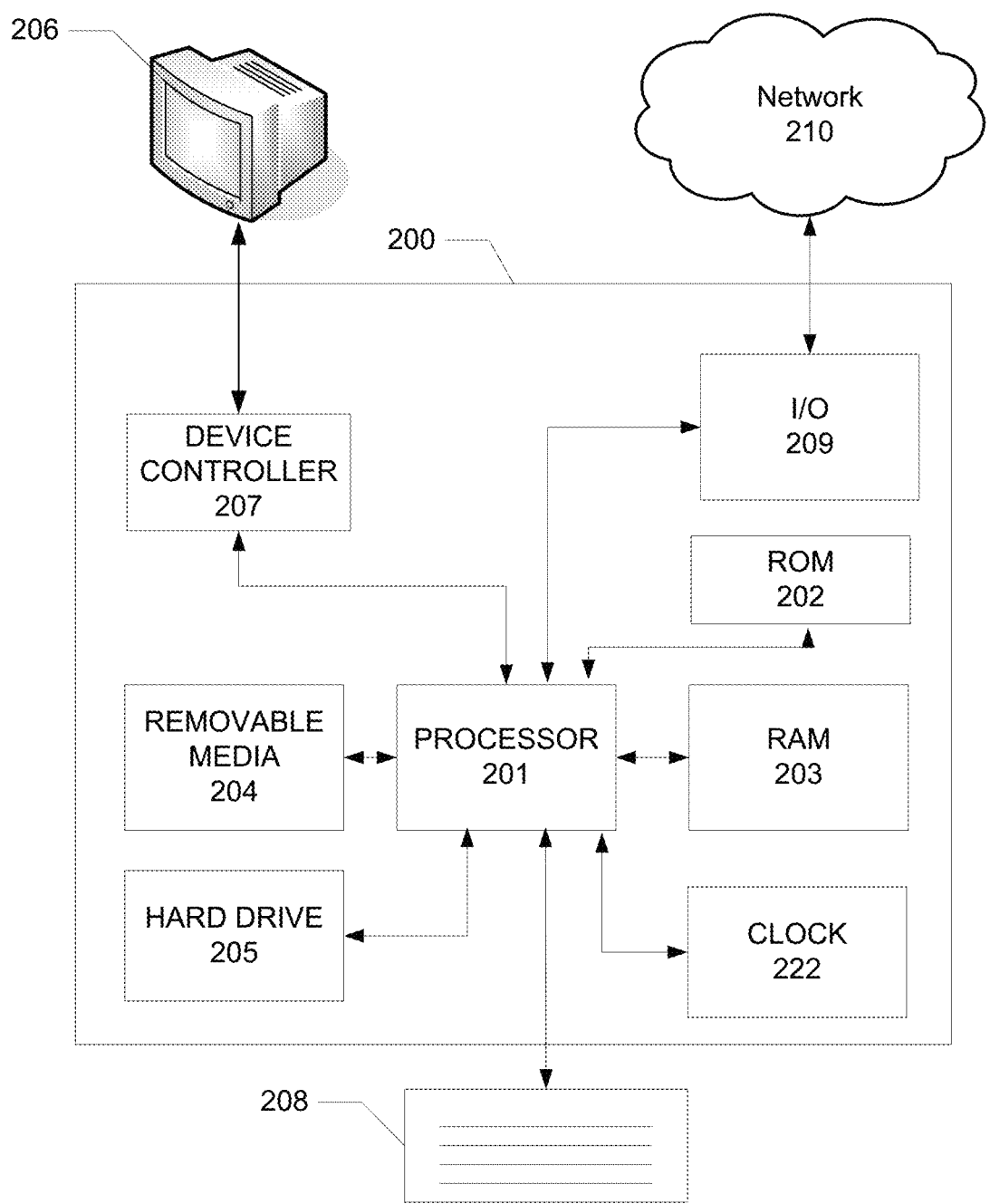
FIG. 2 illustrates an example platform on which various elements described herein can be implemented.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some illustrative embodiments, the interface 209 may include a modem (e.g., a cable modem), and the network 210 may include the communication lines 101 discussed above, the external network 109, an in-home network, a provider's wireless, coaxial, fiber, or hybrid fiber/coaxial distribution system (e.g., a DOCSIS network), or any other desired network.

Aspects of this disclosure may be implemented to enhance the quality of content available at a user device. For example, aspects of this disclosure provide higher quality content at a user device at a point in time that is earlier than when such content would otherwise be available using conventional solutions. A user device may download content using one or more base and differential feeds.

For purposes of illustrative simplicity and consistency, the examples described below relate to the distribution, downloading, and storage of data (e.g., video, audio, etc.). It is understood that the examples could be modified or adapted to accommodate any form of content, such as audio (e.g., music, voice), text files, emails, instant messages, images/pictures, etc.

Figure 3:
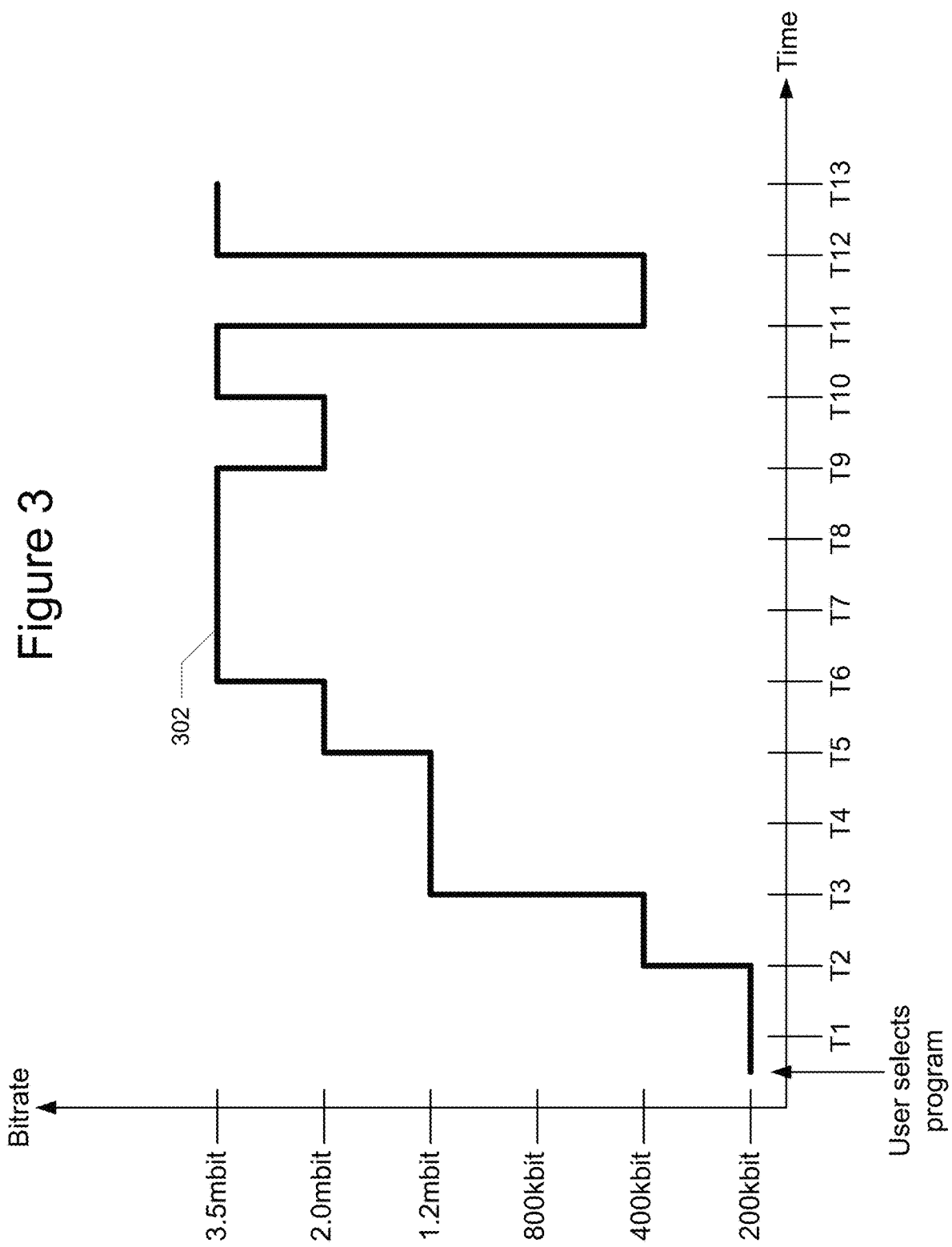
FIGS. 3-4 illustrate example timelines for demonstrating one or more aspects of this disclosure.
Figure 4:
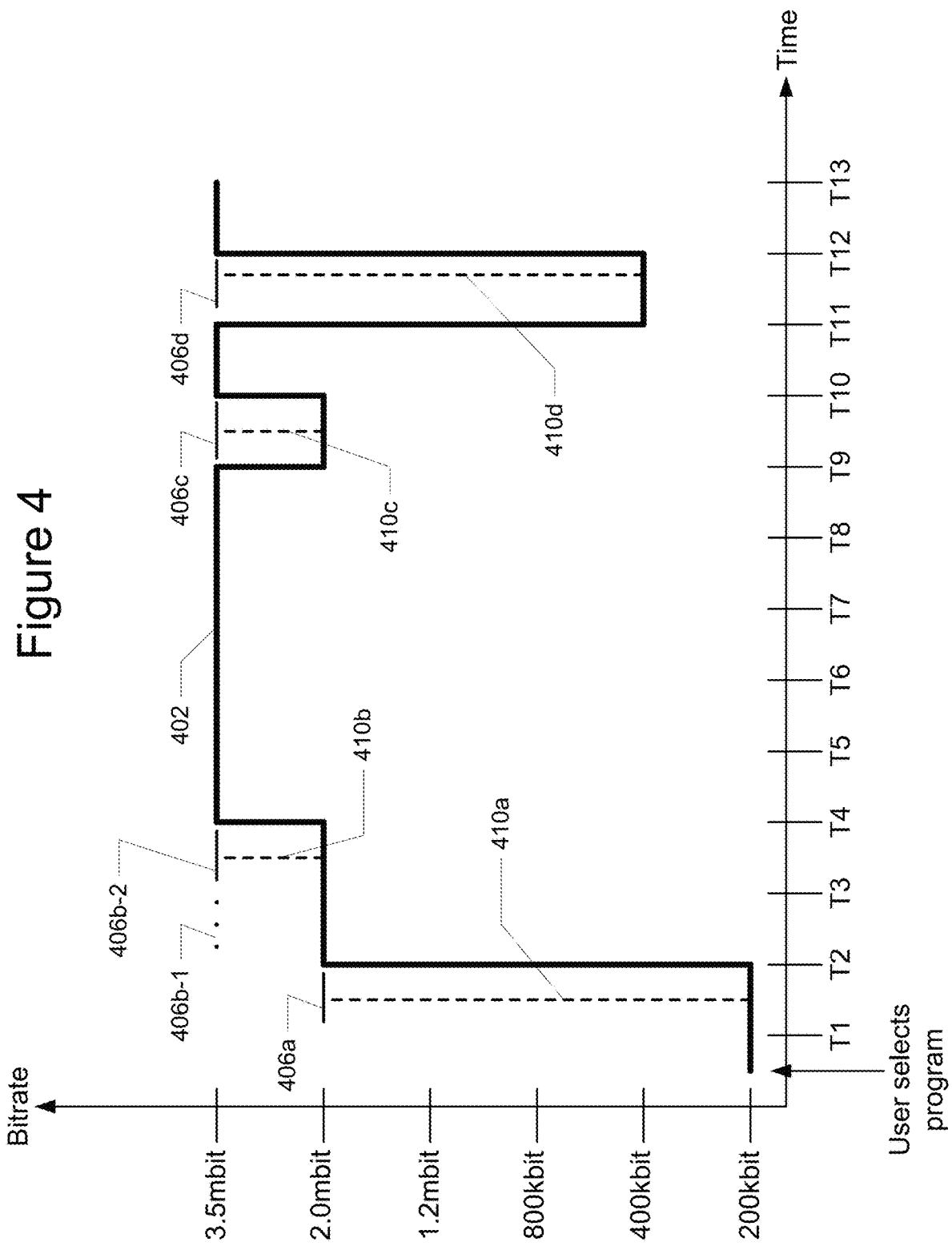

FIGS. 3-4 illustrate example timelines that may be used to demonstrate one or more aspects of this disclosure. The timelines shown in FIGS. 3-4 may be used or operated in connection with one or more environments, devices, or components, such as the environments, devices, and components described above in connection with FIGS. 1-2.

FIG. 3 illustrates a timeline, represented via a heavy line graph 302, that a user device may experience using conventional techniques for selecting content, such as a program, to download. The timeline reflects samples or instances of time on the horizontal axis and various bitrates that may be associated with the program available on one or more feeds on the vertical axis. The time between samples or instances of time may be a function of how blocks of the program are arranged or organized. For example, the time span covered between times T3 and T4 may correspond to one second or two seconds in some illustrative embodiments. FIG. 3 is not necessarily drawn to scale. The values shown in FIG. 3 are for illustrative purposes and may be modified in some embodiments.

At a time just before T1, a user may have selected the program. For example, the user may have selected the program from a database or an electronic programming guide (EPG). A device associated with the user (e.g., a set-top box, a mobile device, a display device, a computer, a laptop, etc.) might not know what bandwidth is available to it, what the network conditions are like, etc. As such, and in response to the user's (or a device's) selection of the program, the user device may initially select the lowest or worst quality bitrate that is available (which, in this case, corresponds to 200 kbit). Selecting the lowest quality bitrate may also tend to minimize the time lag between when the user selected the program and when the program appears on a display screen associated with the user device or is otherwise processed by the device.

As the user device is able to buffer or store more of the program, the user device may "ramp up" its selection of a higher quality version of the program. For example, between T1 and T6, an increase in terms of bitrate or encoding may be realized from 200 kbit to 3.5 mbit.

At T6, the highest quality bitrate is selected, which may reflect that the network that the client is associated with can sustain at least 3.5 mbit of traffic. Starting at T9, and continuing to T10, the user device may select the 2.0 mbit bitrate. The step down associated with T9 may be the result of, e.g., a short burst of interference or other traffic on the network. At T10, the condition that caused the step down at T9 may have subsided or been mitigated, such that the user device can select the 3.5 mbit bitrate once again.

Starting at T11, and continuing to T12, the user device may select the 400 kbit bitrate. The selection of the 400 kbit bitrate may be the result of a drastic network condition, such as the user walking to the edge of a service coverage area (e.g., the edge of a Wi-Fi coverage area). The drop down to the 400 kbit bitrate may be undertaken to avoid a buffer under run (e.g., a lack of data being available at the user device for presentation). Starting at T12, the condition that caused the drop down starting at T11 may have subsided or been mitigated, such that the user device can select the 3.5 mbit bitrate once again.

There are a number of drawbacks associated with the bitrate selections shown in FIG. 3. For example, the ramp up time (e.g., the time period covering just before T1 until T6) from the lowest quality bitrate (200 kbit in the example of FIG. 3) until the highest quality bitrate (3.5 mbit in the example of FIG. 3) is selected is relatively long. In such a scenario, a playback of each better resolution bitrate (e.g., the 1.2 mbit bitrate corresponding to the time covered from T3 to T5) may be required with no way to improve that bitrate until the next timeframe (e.g., T5) when the user device can select a higher bitrate (e.g., 2.0 mbit). In other words, there may be no way to provide higher-quality content at an output device until a corresponding feed associated with the higher-quality content is selected by the user device. Furthermore, if the user wants to engage in a secondary viewing of the program, such as engaging a rewind operation, the user might be forced to view the same lower quality version of the program portion. Thus, if at a time in the playing of the program corresponding to T7 the user initiated a rewind operation or command to a point in time corresponding to T4 in the program, the user might have to watch that portion of the program once again based on a 1.2 mbit bitrate (or, alternatively, the user device would have to re-download the portion of the program corresponding to T4, this time at a higher rate, such as 3.5 mbit).

FIG. 4 illustrates a timeline, represented via a heavy line graph 402, that a user device may experience using one or more techniques described herein for selecting bitrates corresponding to the selected content (e.g., video program). Relative to line graph 302 shown in FIG. 3, line graph 402 attains the highest bitrate (3.5 mbit in these examples) at an earlier point in time. FIG. 4 is not necessarily drawn to scale. The values shown in FIG. 4 are for illustrative purposes and may be modified in some embodiments. For purposes of comparison, it may be assumed that the user device was exposed to identical conditions (e.g., identical or similar network conditions) in relation to the timelines 302 and 402 shown in FIGS. 3 and 4, respectively.

In FIG. 4, horizontal bars 406 may represent differential feeds (e.g., differential channels, layers, or streams, such as MPEG SVC streams). The differential feeds may be indicative of the difference between a base feed (e.g., a base channel, layer, or stream) and a higher quality encoded feed or bitrate. Thus, horizontal bar 406a may be indicative of the difference between a 200 kbit bitrate and a 2.0 mbit bitrate as shown in FIG. 4. Similarly, horizontal bars 406b (shown as 406b-1 and 406b-2) and 406c may be indicative of a difference between a 2.0 mbit bitrate and a 3.5 mbit bitrate. Horizontal bar 406d may be indicative of a difference between a 400 kbit bitrate and a 3.5 mbit bitrate.

In operation, and in response to a selection of the program (e.g., selection by the user), the user device may begin to download the program corresponding to the 200 kbit bitrate as shown. The user device may determine, at a point in time that is slightly after T1, that it completed downloading a portion of the program in less time than the time frame covered by T1 to T2. For example, if the time frame covered by T1 and T2 is equal to one second, and the user device is able to download the portion of the program corresponding to T1-T2 at 200 kbits in five hundredths of a second (0.05), then the user device may determine that it has excess time (in this example, ninety-five hundredths of a second (1 second-0.05 seconds=0.95 seconds)) in which it could download a higher quality version of that portion of the program before the start of the next time frame. The beginning or left-hand part of horizontal bar 406a may represent the user device starting to download the portion of the program at a higher bitrate, namely, the difference between 2.0 mbits and 200 kbits as shown in the example of FIG. 4. In some illustrative embodiments, the differential bitrate may be slightly greater than the actual difference between the two bitrates (e.g., the difference between 2.0 mbits and 200 kbits) due to inefficiencies. Such inefficiencies may, for example, be due to, or be the result of, an encoding used.

The horizontal location of vertical (dashed) bars 410a-410d may be representative of when the user device has completed downloading the portion of the program provided via the differential bitrate or feed. Thus, starting at the time corresponding to vertical bar 410a, the portion of the program corresponding to times T1-T2 may be available to the user device at a quality corresponding to 2.0 mbit. The user device may begin playing back the portion of the program corresponding to T1-T2 at the time represented by the location of vertical bar 410a using 2.0 mbit quality video. In other words, starting at the time coinciding with the location of vertical bar 410a, the program may be displayed using 2.0 mbit quality video based on a 200 kbit base and a 2.0 mbit differential.

At time T2 in FIG. 4, the user device (or associated device) may know, or at least have a high degree of confidence, that that the network conditions are sufficient to support at least 2.0 mbit downloads due to a successful downloading of the 2.0 mbit differential bitrate (between T1 and the temporal or horizontal location of vertical bar 410*a*) as reflected via vertical bar 410*a*. As such, the user device may select a 2.0 mbit base bitrate for the time frame corresponding to T2-T3.

Shortly after the start of T2, the user device may complete downloading the portion of the program corresponding to the time frame from T2-T3 at 2.0 mbit quality. The user device may attempt to download differential 3.5 mbit quality video (e.g., 3.5 mbit–2.0 mbit) corresponding to the portion of the program from T2-T3 in order to enhance its quality. This attempt to download the differential 3.5 mbit quality video is reflected in FIG. 4 via the horizontal bar 406*b*-1. The user device might not have succeeded in downloading the differential 3.5 mbit quality video before the user device might need to start buffering the (2.0 mbit) base for the portion of the program corresponding to T3-T4, and this failure is reflected by horizontal bar 406*b*-1 being shown as dots in FIG. 4. The differential 3.5 mbit quality video reflected by horizontal bar 406*b*-1 might not be used during a live playback of the program.

Shortly after the start of T3, the user device may complete downloading the portion of the program corresponding to the time frame from T3-T4 at 2.0 mbit quality. The user device may attempt to download differential 3.5 mbit quality video (e.g., 3.5 mbit–2.0 mbit) corresponding to the portion of the program from T3-T4 in order to enhance its quality. This attempt to download the differential 3.5 mbit quality video is reflected in FIG. 4 via the horizontal bar 406*b*-2. The user device may complete the download of the differential 3.5 mbit quality video at a time corresponding to the horizontal location of a vertical bar 410*b*. Starting at the time coinciding with the location of vertical bar 410*b*, the program may be displayed using 3.5 mbit quality video based on a 2.0 mbit base and a 3.5 mbit differential.

Similar examples of successful differential downloads are reflected via horizontal bars 406*c* and 406*d* and vertical bars 410*c* and 410*d*. In both cases, a downloading of differential 3.5 mbit quality video may be realized in advance of the time period corresponding to the next portion of the program.

Regarding the unsuccessful download of the differential 3.5 mbit quality video corresponding to horizontal bar 406*b*-1 for time frame T2-T3, as described above 3.5 mbit quality video might not be displayed during a live playback. However, that downloaded 3.5 mbit quality video may still be displayed. For example, at a later point in time (e.g., at time T6 is in FIG. 4), the download of the differential 3.5 mbit quality video corresponding to time frame T2-T3 can be completed to facilitate a secondary viewing or showing. For example, the downloading of the differential 3.5 mbit quality video corresponding to time frame T2-T3 may be completed to allow a user to rewind to the portion of the program corresponding to T2-T3 with the opportunity to provide 3.5 mbit quality video to the user. In general, a user device may request a differential feed for one or more timeframes where the user device did not request the highest base bitrate. Such requests may facilitate secondary playback (e.g., playback from memory) for those timeframes using the highest bitrate.

Comparing the heavy lines graphs 302 and 402 of FIGS. 3 and 4 to one another, one can see that using the techniques described above in connection with FIG. 4 enable higher quality video to be displayed at an earlier point in time relative to the conventional techniques used in connection with FIG. 3. Using the techniques associated with FIG. 4, the user device may determine that it completed downloading a portion of the program in less time than was otherwise allocated. Thus, the user device could attempt to enhance that same portion by downloading a corresponding differential bitrate video (or other content). If that attempt is successful, then the user device may gain confidence that the network can support downloads at the higher rate corresponding to the sum or combination of the base and differential, allowing downloads of future portions to take place using a base at the higher rate. In other words, the "ramp up" time to reach the highest quality video can be reduced by leveraging knowledge gained during previous timeframes, such that the user device can select a higher base rate or feed at a point in time that is earlier relative to conventional techniques.

The user device (or user, via inputs) may determine how aggressive it wants to be in downloading differential bitrate video based on the time it takes the user device to download the base bitrate. Continuing the above example, if the time period between T1 and T2 corresponds to 1 second, and the user device determines that it has completed downloading the base bitrate of 200 kbits 0.05 seconds after the start of T1, then the user device may have a high degree of confidence that it could download differential 2.0 mbit quality video corresponding to that portion in the remaining 0.95 seconds.

The user device may compare bitrates to time to determine how aggressive to be. For example, the user device may compare the proportion of the differential bitrate and the base bitrate to the proportion of the portion time and the base bitrate download time. In this example, the proportion of the differential bitrate and the base bitrate is ten (2.0 mbit/200 kbit=10), which is less than the proportion of portion time and the base bitrate download time of twenty (1 second/0.05 seconds=20). The fact that the proportion of the differential bitrate and the base bitrate is less than the proportion of the portion time and the base bitrate download time may provide the user device confidence that it can download the differential 2.0 mbit quality video in sufficient time. In some illustrative embodiments or in some instances, the proportion of the differential bitrate and the base bitrate may need to be less than the proportion of the portion time and the base bitrate download time by a threshold amount in order to preclude the user device (or user) from being overly aggressive.

In some illustrative embodiments, a measurement of network resources may be facilitated by tracking download performance over time and the user device can adaptively determine whether to be more or less aggressive. For example, if a user device is being moved towards the edge of a service region, and the network device determines that it is taking a longer amount of time to download a similarly sized data block (e.g., a reduction in throughput), the user device can use that information to reduce the base bitrate download for the next (or a future) data block. Similarly, if the expected or anticipated worse network conditions are not realized or actually present, a differential feed may be utilized to quickly get back to a higher bitrate.

In some illustrative embodiments, the user device may determine or measure signal strength and base a decision as to whether to download data using a particular bitrate on the measurement. In some embodiments, the user device may determine or measure a current modulation (or another parameter) used and may base a decision as to whether to download data using a particular bitrate in view of the modulation (or another parameter). In some embodiments, as a user device (e.g., a wireless device) reduces a signal-to-noise (SNR) ratio, a lower modulation profile may be selected.

In some embodiments, the type of content that is downloaded or requested may serve as part of an input to a decision process as to whether to download data using a particular bitrate or feed. For example, if a user browses to a particular website that provides videos on demand, knowledge that the user browsed to that website could be used to predict that it is likely (e.g., within a threshold) that the user will request a video download shortly thereafter.

The user device may include a clock (e.g., clock 222 of device 200 in FIG. 2) and/or a processor to facilitate the measurement of time and conduct computations or calculations to determine what base or differential bitrate feeds to download. For example, the user device may count cycles of the clock to determine when or how early a given download operation will take to complete.

For purposes of presentation, the above examples are based on six base bitrates. In some illustrative embodiments, more or less than six base bitrates may be used. For example, in some embodiments a single base bitrate may be used (e.g., the lowest quality bitrate, which would correspond to 200 kbits in FIGS. 3 and 4), and all of the other higher bitrates would be differentials. The downside to using this approach may include additional bandwidth consumption resulting from inefficiencies, such as inefficiencies in encoding. Less overhead may be incurred in supporting multiple base bitrates.

Figure 5:
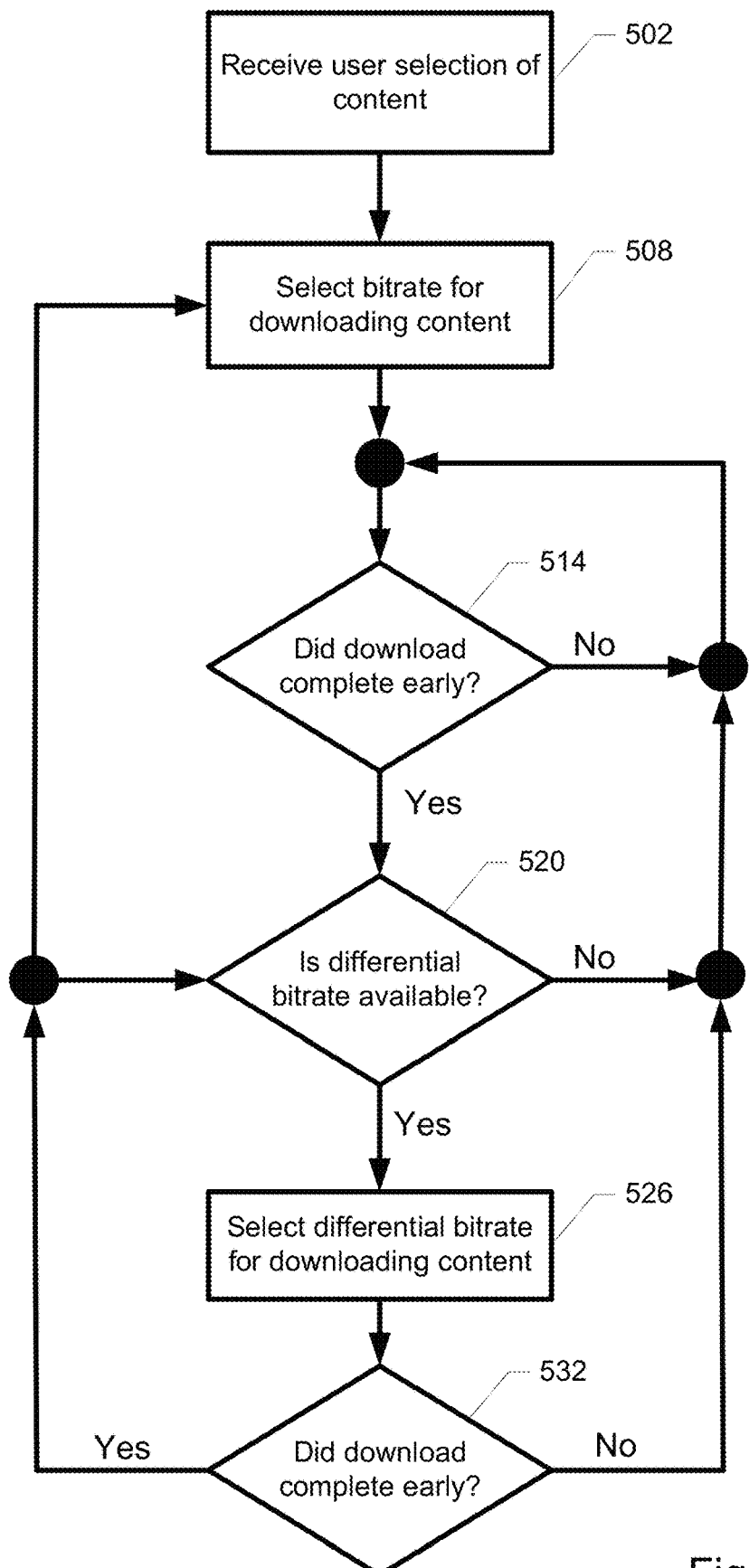
FIG. 5 illustrates an example method for demonstrating one or more aspects of this disclosure.

FIG. 5 illustrates a method in connection with one or more aspects of this disclosure. The method may be executed in conjunction with one or more devices, environments, or architectures, such as the devices, environments, and architectures described above in connection with FIGS. 1-2.

In step 502, a user selection of content may be received. For example, the user selection may correspond to a selection of a television program from a database or an electronic programming guide (EPG), a request for a song to be downloaded from a database, or the like.

In step 508, a bitrate may be selected for downloading the content. In terms of the flow from step 502 to step 508, the selected bitrate of step 508 may correspond to a base or lowest quality bitrate available in a given environment. Referring, for example, to the examples described above in connection with FIGS. 3 and 4, the 200 kbit bitrate may initially be selected in connection with the flow from step 502 to step 508.

In step 514, a determination may be made whether the bitrate selected in step 508 has resulted in a downloading of the content (e.g., a portion, fragment, or segment of the content) completing early (e.g., before the next time block). If the downloading did not complete early (e.g., the "No" path is taken out of step 514), the bitrate for downloading the content may be maintained. In some illustrative embodiments, if the downloading did not complete early, the bitrate associated with the downloading of the content may be reduced (not shown in FIG. 5) in order to avoid a buffer under run, for example.

If it is determined that the download completed early (e.g., the "Yes" path is taken out of step 514), then a determination may be made whether a higher differential bitrate is available in step 520. If a higher differential bitrate is not available (e.g., the "No" path is taken out of step 520), then the flow may proceed back to step 514 with respect to the next portion of the content to be downloaded. If a higher differential bitrate is available (e.g., the "Yes" path is taken out of step 520), then flow may proceed to step 526 to select a differential bitrate for downloading.

In step 526, a differential bitrate may be selected for downloading. The selection may be based at least in part on the proportion of time it took to download the base bitrate, or how early the download of a base bitrate was completed (in connection with step 514), relative to the proportion of the base bitrate and candidate differential bitrates available.

In step 532, a determination may be made whether the selected differential bitrate download completed early. If it did not (e.g., the "No" path is taken out of step 532), then flow may proceed back to step 514 using the same base bitrate for the next portion of the content. If the differential bitrate download completed early (e.g., the "Yes" path is taken out of step 532), then flow may proceed to step 508 where the base bitrate may be modified to correspond to the differential bitrate selected in connection with step 526. Alternatively, if the differential bitrate download completed early (e.g., the "Yes" path is taken out of step 532), then flow may proceed to step 520, to determine whether another differential bit rate (e.g., an even higher quality bit rate) is available.

The method described above in connection with FIG. 5 is illustrative. In some embodiments, the order of the steps (or portions thereof) may be modified from what is shown in FIG. 5. Some of the steps (or portions thereof) may be optional in some embodiments. Additional steps not shown may be included in some embodiments.

Examples described above related to adaptively selecting content in accordance with a bitrate. Bitrates are representative of only one quality related aspect. In some embodiments, selections may be based on one or more other quality related aspects or parameters. For example, one or more of throughput, processing speed, compression/decompression, modulation, signal quality/fidelity, etc., may be analyzed as part of a selection process.

The techniques described herein may apply to data at any level of abstraction or organization. For example, content may be fragmented into various-sized pieces, and the techniques may be applied to one or more of the pieces. In some embodiments, fragmentation may be used to enhance particular portions of, e.g., a content item or asset. For example, one or more prioritization schemes may be used in conjunction with fragmentation to enhance particular pieces of a content item. In some embodiments, enhanced fragments may be used in connection with advertising or solicitation. For example, enhanced pieces of content may be used as a trailer or promotion for the content.

In some embodiments, one or more devices (e.g., one or more servers, one or more user devices, etc.) may include a fragmentor configured to fragment, e.g., a content item or asset. The fragmentor may be tied or coupled to an originating server, such as a content provider server.

While some examples have been described above in the context of television technology and communications, aspects of this disclosure may readily be applied to, and may be adapted to be operative on, one or more other communication systems. Those communication systems may include computer networks, cellular networks, satellite networks, and the like. In some embodiments, communications may be based on one or more standards, protocols, or the like. For example, communications may be IP-based in some embodiments.

Although not required, various aspects described herein may be embodied as a method, a data processing system, and/or as a transitory and/or non-transitory computer-readable medium storing executable instructions. Accordingly, those aspects may take the form of an entirely hardware embodiment, an entirely software embodiment, an entirely firmware embodiment, or an embodiment combining software, firmware, and/or hardware. The functionality may be resident in a single computing device or application, or may be distributed across multiple computing devices/platforms or applications, the multiple computing devices/platforms optionally being connected to one another via one or more networks. Moreover, the structural components described herein may be distributed amongst one or more devices, optionally within a common housing or casing.

Various signals representing content, data, or events as described herein may be transferred between a source and a destination in the form of electromagnetic waves traveling through signal-conducting media such as metal wires, optical fibers, and/or wireless transmission media (e.g., air and/or space).

The various methods and acts may be operative across one or more computing servers and one or more networks. The functionality may be distributed in any manner, or may be located in a single computing device (e.g., a server, a client computer, etc.).

The methodological acts and processes described herein may be tied to particular machines or apparatuses. For example, as described herein, content may be downloaded based at least in part on one or more base bitrates and one or more differential bitrates. More generally, one or more apparatuses may include one or more processors and memory storing instructions that, when executed by the one or more processors, cause the one or more apparatuses to perform the methodological acts and processes described herein. Furthermore, the methodological acts and processes described herein may perform a variety of functions including transforming an article (e.g., content corresponding to a base bitrate) into a different state or thing (e.g., enhanced or higher quality content based on content downloaded via a base bitrate and content downloaded via a differential bitrate).

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above in any order. It will also be appreciated and understood that modifications may be made without departing from the true spirit and scope of the present disclosure. The description is thus to be regarded as illustrative instead of restrictive on the present disclosure.

The invention claimed is:

1. A non-transitory computer-readable medium storing executable instructions that, when executed by an apparatus, cause the apparatus to:
   receive a first portion of a feed for a requested content item;
   determine that the receipt of the first portion of the feed completed before an anticipated point in time;
   request, based on the determination that the receipt of the first portion of the feed completed before the anticipated point in time, a differential data for the requested content item; and
   receive the differential data and a second portion of the feed.

2. The non-transitory computer-readable medium of claim 1, wherein the differential data comprises higher quality data relative to the feed.

3. The non-transitory computer-readable medium of claim 1, wherein the instructions, when executed, further cause the apparatus to:
   receive a request for the content item; and
   based on receiving the request, select, among a plurality of available data associated with the content item, the feed, wherein the feed is associated with a base bitrate.

4. The non-transitory computer-readable medium of claim 1, wherein the instructions, when executed, further cause the apparatus to:
   determine that the receipt of the differential data completed before the anticipated point in time, wherein the anticipated point in time comprises a point in time at which the apparatus anticipated receipt of at least the first portion of the feed be completed.

5. The non-transitory computer-readable medium of claim 4, wherein the differential data comprises higher quality data relative to the feed, and wherein the instructions, when executed, further cause the apparatus to:
   cause higher quality output data to be output based on determining that the receipt of the differential data completed before the anticipated point in time.

6. The non-transitory computer-readable medium of claim 4, wherein the instructions, when executed, further cause the apparatus to:
   modify, based on the differential data, a base bitrate for a future feed based on determining that the receipt of the differential data completed before the anticipated point in time.

7. The non-transitory computer-readable medium of claim 1, wherein the differential data comprises higher quality data relative to the feed, wherein the instructions, when executed, further cause the apparatus to:
   receive a command for a secondary playback of the content item; and
   based on receiving the command for the secondary playback, cause higher quality output data to be output based on the higher quality data.

8. The non-transitory computer-readable medium of claim 1, wherein the differential data for the requested content item comprises a differential data for the first portion of the feed.

9. An apparatus comprising:
   one or more processors; and
   memory storing instructions that, when executed by the one or more processors, cause the apparatus to:
      receive a first portion of a feed for a requested content item;
      determine that the receipt of the first portion of the feed completed before an anticipated point in time;
      request, based on the determination that the receipt of the first portion of the feed completed before the anticipated point in time, a differential data for the requested content item; and
      receive the differential data and a second portion of the feed.

10. The apparatus of claim 9, wherein the differential data comprises higher quality data relative to the feed.

11. The apparatus of claim 9, wherein the instructions, when executed by the one or more processors, cause the apparatus to:
receive a request for the content item; and
based on receiving the request, select, among a plurality of available data associated with the content item, the feed, wherein the feed is associated with a base bitrate.

12. The apparatus of claim 9, wherein the instructions, when executed by the one or more processors, cause the apparatus to:
determine that the receipt of the differential data completed before the anticipated point in time, wherein the anticipated point in time comprises a point in time at which the apparatus anticipated receipt of at least the first portion of the feed be completed.

13. The apparatus of claim 12, wherein the differential data comprises higher quality data relative to the feed, and wherein the instructions, when executed by the one or more processors, cause the apparatus to:
cause higher quality output data to be output based on determining that the receipt of the differential data completed before the anticipated point in time.

14. The apparatus of claim 12, wherein the instructions, when executed by the one or more processors, cause the apparatus to:
modify, based on the differential data, a base bitrate for a future feed based on determining that the receipt of the differential data completed before the anticipated point in time.

15. The apparatus of claim 9, wherein the differential data comprises higher quality data relative to the feed, and wherein the instructions, when executed by the one or more processors, further cause the apparatus to:
receive a command for a secondary playback of the content item; and
based on receiving the command for the secondary playback, cause higher quality output data to be output based on the higher quality data.

16. The apparatus of claim 9, wherein the differential data for the requested content item comprises a differential data for the first portion of the feed.

17. A system comprising:
a first device and a second device,
wherein the first device comprises:
one or more first processors; and
first memory storing a first instructions that, when executed by the one or more first processors, cause the first device to:
receive a first portion of a feed for a requested content item;
determine that the receipt of the first portion of the feed completed before an anticipated point in time;
request, based on the determination that the receipt of the first portion of the feed completed before the anticipated point in time, a differential data for the requested content item; and
receive the differential data and a second portion of the feed, and
wherein the second device comprises:
one or more second processors; and
second memory storing second instructions, that when executed by the one or more second processors, cause the second device to:
transmit the first portion of the feed to the first device.

18. The system of claim 17, wherein the first instructions, when executed by the one or more first processors, cause the first device to:
receive a request for the content item; and
based on receiving the request, select, among a plurality of available data associated with the content item, the feed, wherein the feed is associated with a base bitrate.

19. The system of claim 17, wherein the first instructions, when executed by the one or more first processors, cause the first device to:
determine that the receipt of the differential data completed before the anticipated point in time, wherein the anticipated point in time comprises a point in time at which the first device anticipated receipt of at least the first portion of the feed be completed, and wherein the differential data comprises higher quality data relative to the feed; and
cause higher quality output data to be output based on the higher quality data based on determining that the receipt of the differential data completed before the anticipated point in time.

20. The system of claim 17, wherein the differential data comprises higher quality data relative to the feed, and wherein the first instructions, when executed by the one or more first processors, cause the first device to:
receive a command for a secondary playback of content; and
based on receiving the command for the secondary playback, cause higher quality output data to be output based on the higher quality data.

* * * * *

UNITED STATES PATENT AND TRADEMARK OFFICE
CERTIFICATE OF CORRECTION

PATENT NO. : 10,965,970 B2
APPLICATION NO. : 15/863056
DATED : March 30, 2021
INVENTOR(S) : Gilson It is certified that error appears in the above-identified patent and that said Letters Patent is hereby corrected as shown below:

In the Specification

Column 3, Detailed Description, Line 31:
Delete "HTMLS," and insert --HTML5,-- therefor Signed and Sealed this
Twentieth Day of February, 2024

Katherine Kelly Vidal
*Director of the United States Patent and Trademark Office*